3,106,577
PREPARATION OF ACRYLIC ACID
John Ciocchetti, Armenia, Caldas, Colombia, assignor to Acidos Grasos Limitada, Armenia, Caldas, Colombia
Filed June 27, 1960, Ser. No. 40,493
4 Claims. (Cl. 260—533)

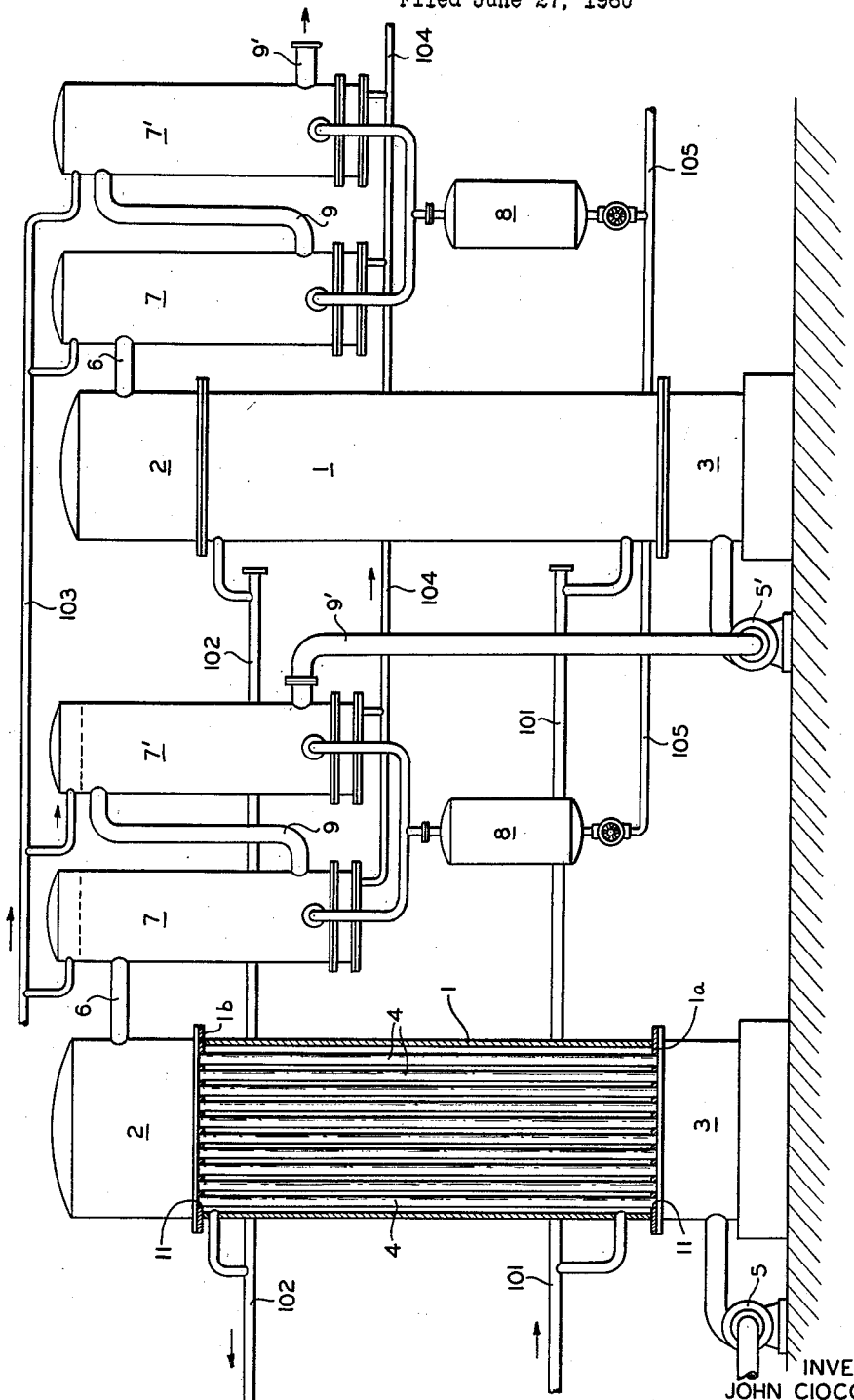

This invention relates to a process for preparing acrylic acid by synthesis from acetylene, carbon monoxide and water and provides a process in which these ingredients can be reacted with each other in gaseous phase and in which the acrylic acid formed can be directly separated in anhydrous condition from gaseous phase by cooling.

It has been previously suggested to form acrylic acid and/or its esters by reacting equimolecular amounts of $C_2H_2$, CO and $H_2O$ and, if necessary, an alcohol for forming an ester. However, in these known processes the reaction is always carried out in a liquid reaction mixture which contains, in addition to various catalysts, water and/or an alcohol, and from which the acrylic acid formed has to be separated by distillation or other steps. Moreover, these known processes require the use of relatively high pressure.

In contrast to these known processes, the applicant has found that acrylic acid can be obtained from $C_2H_2$, CO and $H_2O$ by contacting a mixture of $C_2H_2$, CO and $H_2O$ with silica gel as a catalyst at a temperature and for a time sufficient for formation of the acrylic acid. The reaction can be a gas phase reaction in which reactants and product are in the gas phase and a feature of the invention is the carrying out of the reaction in this manner since in consequence of such operation recovery of the product is facilitated. Thus, the product acrylic acid can be recovered by cooling the gas mixture to condense the acid whereupon anhydrous acid is recovered.

The reaction can be represented by the following equation:

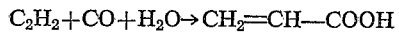

$$C_2H_2 + CO + H_2O \rightarrow CH_2 = CH - COOH$$

The preferred temperature for the gas phase reaction is 200–220° C. The pressure can be atmospheric, and, where a fluidized bed of silica gel is maintained in the reaction zone, atmospheric plus the head loss through the bed.

In a preferred manner of operation the gas mixture of $C_2H_2$, CO and $H_2O$ can be contacted in a reaction zone with the silica gel, withdrawn from the reaction zone, cooled to condense product acrylic acid and provide a condenser effluent gas mixture of $C_2H_2$, CO, and $H_2O$ and which may contain some acrylic acid, and this condenser effluent gas mixture can be used for producing more acrylic acid by contacting with silica gel. Contacting of condenser effluent gas can be by recycling or by passing a gas mixture serially through a first silica gel bed, condenser, and then a second silica gel bed and another condenser. By operation in the last mentioned manner high conversions can be obtained, and desirably, effluent gas from the second condenser is recycled to the first silica gel bed.

Equimolecular proportions of the reactants is a suitable condition of operation and no diluent is required. Thus, the invention provides a highly efficient conversion. Further, in comparison with the known procedures wherein a liquid medium is employed, the method of the invention is not complicated by necessity for separating the product from a liquid.

The following example describes a specific embodiment of, and a best mode for carrying out, the invention, to which the invention is not limited. The appended drawing illustrates, by way of example, an apparatus in which the process of the invention can be carried out.

Equimolecular amounts of a gas mixture of $C_2H_2$, $H_2O$ and $H_2O$ vapor, are introduced into and mixed in conventional manner to a uniform gaseous mixture and preheated to 70°–80° in a tank (not shown in the appended drawing). From said tank, the reaction mixture is introduced by a fan 5 into cylindrical reactor 1, the structure of which is substantially similar to that of a conventional heat exchanger or condenser. The reactor or cylinder 1 consists preferably of steel and has two plates 1-a and 1-b, which contain a suitable number of registering holes 11, in which tubes 4 made of steel with high nickel content are inserted and fastened in conventional manner. Cylinder 1 has flanges at both ends and these flanges are bolted to registering flanges of an upper chamber 2 and a lower chamber 3, respectively. The gaseous starting mixture of the reactants is supplied by fan 5 to chamber 3 and tubes 4 and the gases reacted in tubes 4 pass to chamber 2. Instead of using nickel steel tubes, Pyrex glass tubes can be used.

Silica gel of particle size such that a fluidized bed of the silica gel results upon passage of the gas mixture therethrough, is contained within the tubes 4. The particle size can be less than about 400 microns and suitable ranges of particle sizes are 400–74 microns, and 420–110 microns.

The silica gel can contain up to about 0.4% impurities, preferably not more than 0.2%. A gel marketed by Davidson Chemical Company, Baltimore, Md., as grade 12 and reported by the manufacturer to have the following analysis has been found to be satisfactory.

| | Percent |
|---|---|
| Silica gel as $SiO_2$ | 99.71 |
| Sodium as $Na_2O$ | 0.02 |
| Iron as $Fe_2O_3$ | 0.03 |
| Calcium as CaO | 0.02 |
| Titanium as $TiO_2$ | 0.09 |
| Zirconium as $ZrO_2$ | 0.03 |

The head at which the gas mixture is supplied to the tubes 4 is atmospheric plus the head loss through the tubes. The head will be proportional to the height of settled catalyst in the tubes. In this example a settled height ⅓ the height of the tubes and one meter in amount is employed and the head is 300–340 mm. of water.

The reaction zone is within the tubes 4 and is at 200–220° C. The heat for maintaining this temperature is provided in part by heat resulting from adsorption of gas by the silica gel and additional heat is provided by passing water vapor or another suitable heating medium, e.g. a mixture of diphenyl and diphenyl oxide, at 180–200° C. in the space between the outer surface of tubes 4 and the inner surface of cylinder 1.

During passage through tubes 4, the gas mixture keeps the silica gel in turbulent suspension, whereby good contact between the reaction gases and the silica gel catalyst, as well as a relatively rapid passage of the gases through tubes 4 is attained.

From tubes 4 the gases pass to upper chamber 2, in which they lose much of their speed, whereby silica gel particles which may have been carried along fall downward.

From chamber 2 the reaction mixture passes through tube 6 to a water-cooled condenser 7, in which the gas mixture is cooled to about 130° C. and acrylic acid is condensed and drops into tank or container 8. The gases, which still contain acrylic acid, escape from 7 through tube 9 to a second water-cooled condenser 7', in which their residual acrylic acid content is condensed and drops likewise into the beforementioned container 8. The gaseous reaction mixture freed from acrylic acid in said second condenser 7', passes through tube 9' to pump 5' and is fed by this pump to a second reactor unit which consists of the same elements and structural parts as the reactor unit described above, i.e. a substantially identical reactor 1, two condensers 7 and 7' and a container 8 for recovering the liquified acrylic acid. The heating medium is supplied to both reactors 1, 1 through tubing 101 and is discharged from both reactors through tubing 102.

The water for indirect cooling of condensers 7, 7', 7, 7' is fed through tubing 103 and discharged from said condensers through tubing 104. The acrylic acid is discharged from containers 8, 8 through tubing 105. The gaseous reaction mixture, from which the acrylic acid formed has been separated by cooling, escapes from the fourth condenser 7', on the right in the drawing, through tube 9' and can be recycled.

The acrylic acid product is substantially pure and anhydrous and can be crystallized by cooling to about 4–5° C.

In the foregoing example, employing equimolecular amounts of the reactants, the reaction is about 28–30% complete in the first reaction cylinder, and about 20–22% complete in the second reaction cylinder.

While the mechanisms for the reaction are not surely known and while it is not desired to predicate the invention on any theory as to the reaction or reactions involved, it has been observed that a small quantity of formic acid is present in the effluent gases from the reactors. The overall reaction may occur in two steps, in the first of which formic acid is formed and in the second of which the acrylic acid is formed from the formic acid and acetylene.

While the invention has been described with reference to a particular embodiment thereof, various modifications and alternatives will occur to those skilled in the art and it is desired to secure by these Letters Patent all such modifications as are within the scope of the appended claims.

What is claimed is:

1. A process for producing acrylic acid consisting essentially of contacting a mixture of $C_2H_2$, CO, and $H_2O$ with a catalyst consisting of silica gel at a temperature of about 200–220° C.

2. A process for producing acrylic acid which comprises contacting a gas mixture of $C_2H_2$, CO and $H_2O$ with a fluidized catalyst bed of silica gel particles at a temperature of 200–220° C.

3. A process for producing acrylic acid which comprises passing a gas mixture of $C_2H_2$, CO and $H_2O$ through a fluidized bed of silica gel particles maintained in a reaction zone while maintaining the temperature in said zone at about 200–220° C., whereby acrylic acid is formed in the gas mixture, cooling the effluent gas from said reaction zone to condense acrylic acid therefrom as anhydrous acrylic acid and provide a condenser effluent gas mixture of $C_2H_2$, CO and $H_2O$, and producing more acrylic acid from the condenser effluent gas by passing it through a bed of silica gel as aforesaid.

4. A process according to claim 3, wherein the first mentioned gas mixture contains equimolecular amounts of $C_2H_2$, CO and $H_2O$.

References Cited in the file of this patent
UNITED STATES PATENTS
2,845,451    Lautenschlager et al. _____ July 29, 1958